United States Patent
Liu et al.

(10) Patent No.: US 12,192,798 B2
(45) Date of Patent: Jan. 7, 2025

(54) NON-PUBLIC NETWORK CONFIGURATION METHOD AND APPARATUS, CU, DU, BASE STATION, AND COMPUTER-READABLE STORAGE MEDIUM

(71) Applicant: ZTE CORPORATION, Guangdong (CN)

(72) Inventors: Zhuang Liu, Guangdong (CN); Yin Gao, Guangdong (CN); Jiren Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 457 days.

(21) Appl. No.: 17/426,428

(22) PCT Filed: Jan. 17, 2020

(86) PCT No.: PCT/CN2020/072605
§ 371 (c)(1),
(2) Date: Jul. 28, 2021

(87) PCT Pub. No.: WO2020/156217
PCT Pub. Date: Aug. 6, 2020

(65) Prior Publication Data
US 2022/0110009 A1    Apr. 7, 2022

(30) Foreign Application Priority Data

Jan. 29, 2019  (CN) .......................... 201910087976.X

(51) Int. Cl.
*H04W 24/00* (2009.01)
*H04W 24/04* (2009.01)
(Continued)

(52) U.S. Cl.
CPC ......... *H04W 24/04* (2013.01); *H04W 68/005* (2013.01); *H04W 72/20* (2023.01); *H04W 84/045* (2013.01); *H04W 88/12* (2013.01)

(58) Field of Classification Search
CPC ................. H04W 24/04; H04W 72/20; H04W 68/005; H04W 84/045; H04W 88/12
See application file for complete search history.

(56) References Cited

U.S. PATENT DOCUMENTS

| | | | |
|---|---|---|---|
| 2009/0129350 A1* | 5/2009 | Khandekar | ........... H04W 48/08 370/332 |
| 2011/0032871 A1 | 2/2011 | Xu et al. | |

(Continued)

FOREIGN PATENT DOCUMENTS

| | | |
|---|---|---|
| CN | 106550490 A | 3/2017 |
| CN | 108616933 A | 10/2018 |

(Continued)

OTHER PUBLICATIONS

First Office Action for the Chinese Application No. 201910087976, mailed Dec. 19, 2022, 14 pages.

(Continued)

*Primary Examiner* — Khai M Nguyen
(74) *Attorney, Agent, or Firm* — KDW Firm PLLC

(57) ABSTRACT

Provided are a non-public network configuration method and apparatus, a centralized unit (CU), a distributed unit (DU), a base station, and a computer-readable storage medium. The method includes: a CU acquiring configuration information of closed access group (CAG) cells of at least one DU in a base station to which the CU belongs; and the CU determining information about an activated CAG cell according to the configuration information of the CAG cells, and notifying the at least one DU of the information about the activated CAG cell.

18 Claims, 12 Drawing Sheets

(51) Int. Cl.
*H04W 68/00* (2009.01)
*H04W 72/20* (2023.01)
*H04W 84/04* (2009.01)
*H04W 88/12* (2009.01)

(56) References Cited

U.S. PATENT DOCUMENTS

| | | | | |
|---|---|---|---|---|
| 2018/0302878 A1* | 10/2018 | Byun | | H04W 88/16 |
| 2018/0324752 A1* | 11/2018 | Kim | | H04W 68/02 |
| 2022/0132626 A1* | 4/2022 | Xu | | H04W 76/11 |

FOREIGN PATENT DOCUMENTS

| | | | |
|---|---|---|---|
| CN | 109246746 A | * | 1/2019 |
| CN | 110536331 A | | 12/2019 |
| WO | 2018203739 A1 | | 11/2018 |
| WO | 2020198632 A1 | | 10/2020 |

OTHER PUBLICATIONS

First Search Report for the Chinese Application No. 201910087976, mailed Dec. 7, 2022, 6 pages.
ZTE, "Discussion on UE Initial Access and UE RB Context management" 3GPP TSG RAN WG3 NR#97 R3-172918 Berlin, Germany, Aug. 21-25, 2017.
China Telecom, ZTE—"New Work Item Proposal on CAG support for NR" 3GPP TSG RAN Meeting #82 RP-182795 Sorrento, Italy, Dec. 10-13, 2018.
Second Office Action for the Chinese Application No. 201910087976. X, mailed May 19, 2023, 10 pages.
Search Report for Chinese Application No. 201910087976.X, mailed May 19, 2023, 5 pages.
International Search Report for the International Patent Application No. PCT/CN2020/072605, mailed Apr. 15, 2020, 4 pages.
China Telecom. "Motivation for new SI Proposal on CSG support for NR" 3GPP TSG RAN Meeting #82, RP-182339, Dec. 13, 2018.
Intel Corporation: "NPN support in NG-RAN," 3GPP Draft; R3-193721-NPN-DISC-V4, (3GPP), vol. RAN WG3, Aug. 17, 2019.
ZTE: "Impact on NPN on F1," 3rd Generation Partnership Project (3GPP), vol. RAN WG3, Oct. 4, 2019.
Ericsson, "Discussion to CAG selection," 3GPP Draft; C1-190028, 3rd Generation Partnership Project (3GPP), vol. CT WG1, Jan. 14, 2019.
"3rd Generation Partnership Project; Technical Specification Group Radio Access Network; NG-RAN; F1 application protocol (F1AP) (Release 15)" vol. RAN WG3, No. V15.4.1, Jan. 14, 2019, pp. 1-192.
European Search Report for Application No. 20749751 dated Nov. 15, 2023.

* cited by examiner

NON-PUBLIC NETWORK CONFIGURATION METHOD AND APPARATUS, CU, DU, BASE STATION, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2020/072605, filed on Jan. 17, 2020, which is based on and claims priority to Chinese Patent Application No. 201910087976.X filed with the CNIPA on Jan. 29, 2019, the disclosure of which is incorporated herein by reference in its entirety" below the title.

This application claims priority to Chinese Patent Application No. 201910087976.X filed with the CNIPA on Jan. 29, 2019, the disclosure of which is incorporated herein by reference in its entirety.

TECHNICAL FIELD

The present disclosure relates to a non-public network configuration method and apparatus, a centralized unit (CU), a distributed unit (DU), a base station, and a computer-readable storage medium.

BACKGROUND

Non-public networks (NPN) refer to that one or more cells in a mobile communication network have limitations and conditions for users to access, while common cells can allow all legitimate subscribers (and roaming users) of operators to access. The concept of closed access group (CAG) may be used for access control of the NPN. A CAG refers to a group of subscribers allowed to access one or more specific cells. Moreover, one user may belong to a plurality of CAGs. Each CAG is identified by a CAG identity (ID). A user equipment (UE), also known as a terminal, maintains a CAG ID list (an ID list of allowed CAGs) of the CAGs to which it belongs. Each CAG cell broadcasts one CAG ID, and members of the closed access group identified by the one CAG ID can access the cell.

In addition, close CAG cells and hybrid CAG cells may exist in the CAG cells. For a close CAG cell, only subscribers belonged to this CAG can access the cell. For a hybrid CAG cell, both subscribers belonged to this CAG and other subscribers not belonging to this CAG can also access the cell.

The 5th generation mobile communication system (5G) network architecture has innovation and networking flexibility. A base station in the 5G network may be split into two functional entities, i.e., a centralized unit (CU) and a distributed unit (DU). One base station includes one centralized unit controlling a plurality of distributed units. FIG. 1 is a schematic diagram of an interface between a CU and a DU. As shown in FIG. 1, in the CU-DU split network architecture, delay-insensitive network functions are placed in the CU and delay-sensitive network functions are placed in the DU. The CU and the DU perform transmission and are connected through ideal fronthaul or non-ideal fronthaul, thus implementing multi-point cooperation functions and supporting flexible networking of split or integrated stations.

For a cell, it is necessary to configure whether the cell is a CAG cell and to configure a cell type (close or hybrid). A UE needs to identify the CAG ID and cell type of a cell so as to determine whether the cell can serve the UE. However, when the base station is split into a centralized unit and a distributed unit, cell management of the base station is coordinated by the CU and the DU in the architecture. There is no process or method supporting how centralized unit nodes and distributed unit nodes perform CAG cell configuration.

SUMMARY

The present disclosure provides a non-public network configuration method and apparatus, a CU, a DU, a base station, and a computer-readable storage medium so as to implement configuration of a CAG cell.

A non-public network configuration method is provided in the embodiments of the present disclosure and includes steps described below.

A centralized unit (CU) acquires configuration information of closed access group (CAG) cells of one or more distributed units (DUs) in a base station to which the CU belongs.

The CU notifies the one or more DUs of information about an activated CAG cell.

A non-public network configuration method is further provided in the embodiments of the present disclosure and includes steps described below.

A distributed unit (DU) sends configuration information of closed access group (CAG) cells to a centralized unit (CU).

The DU determines information about an activated CAG cell according to a notification from the CU.

A non-public network configuration apparatus is further provided in the embodiments of the present disclosure and includes an acquisition module and a notification module.

The acquisition module is configured to acquire configuration information of closed access group (CAG) cells of one or more distributed units (DUs) in a base station to which the acquisition module belongs.

The notification module is configured to notify the one or more DUs of the information about the activated CAG cell.

A non-public network configuration apparatus is further provided in the embodiments of the present disclosure and includes a sending module and a determination module.

The sending module is configured to send configuration information of closed access group (CAG) cells to a centralized unit (CU).

The determination module is configured to determine information about an activated CAG cell according to a notification from the CU.

A centralized unit (CU) is further provided in the embodiments of the present disclosure and includes a memory, a processor, and a computer program stored in the memory and executable by the processor. When executing the program, the processor implements the non-public network configuration method.

A distributed unit (DU) is further provided in the embodiments of the present disclosure and includes a memory, a processor, and a computer program stored in the memory and executable by the processor. When executing the program, the processor implements the non-public network configuration method.

A base station is further provided in the embodiments of the present disclosure and includes the centralized unit (CU) and one or more distributed units (DUs).

A computer-readable storage medium is further provided in the embodiments of the present disclosure and is configured to store computer-executable instructions for executing the non-public network configuration method.

According to embodiments of the present disclosure, the method includes: a centralized unit (CU) acquiring configuration information of closed access group (CAG) cells of one or more distributed units (DUs) in a base station to which the CU belongs; and the CU notifying the one or more DUs of information about an activated CAG cell. Through the embodiments of the present disclosure, the blank of CAG cell configuration in a CU-DU split network architecture is filled, the CAG cell configuration of CU nodes and DU nodes is implemented, and further, the CU/DU can cooperate to page UEs and initial user access based on the CAG cell configuration, and notify other base stations of the CAG cell configuration for resource coordination among base stations.

DETAILED DESCRIPTION

Embodiments of the present disclosure will be described below in detail in conjunction with the drawings.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

The embodiments of the present disclosure propose that the configuration of a non-public network is implemented through direct exchange between a CU and a DU.

Figure 1:
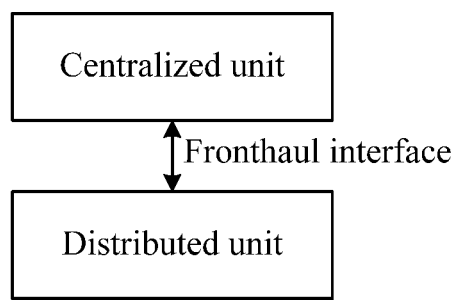
FIG. 1 is a diagram illustrating an interface between a CU and a DU.
Figure 2:
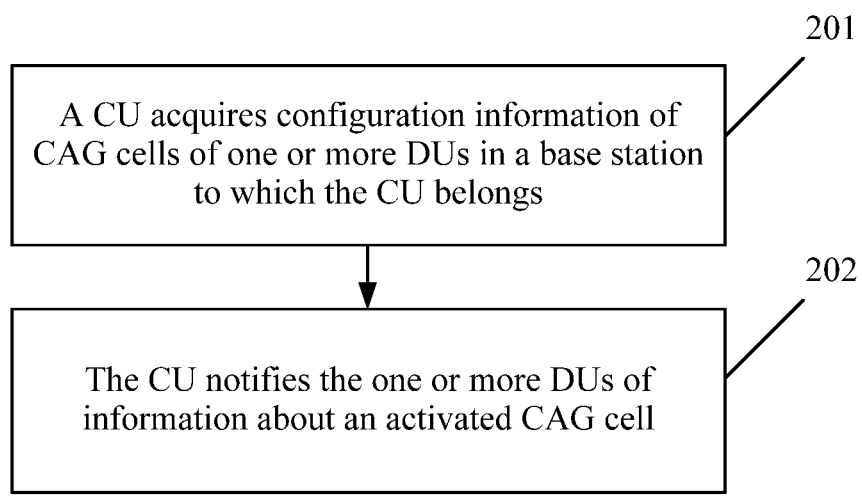
FIG. 2 is a flowchart of a non-public network configuration method according to an embodiment of the present disclosure (applied to a CU)

As shown in FIG. 2, a non-public network configuration method on a CU side provided in the embodiments of the present disclosure includes steps described below.

Step 201: A CU acquires configuration information of CAG cells of one or more DUs in a base station to which the CU belongs.

The CU may obtain the configuration information of the CAG cells through a fronthaul interface between the CU and the DU.

The configuration information of the CAG cells may include, but is not limited to, cell identities of the CAG cells, types of the CAG cells, CAG identities configured for the CAG cells, and the like.

In an embodiment, the step 201 includes a step described below.

The CU receives a first message sent by the one or more DUs, wherein the first message carries first configuration information including the configuration information of the CAG cells of the one or more DUs.

The first message may include, but is not limited to an F1 setup request message, a DU configuration update request message, and the like.

In an embodiment, the first configuration information may include, but is not limited to, at least one of: one or more cell identities; indication information about a cell type which includes at least one of a close CAG cell, a hybrid CAG cell, or a non-CAG cell; one or more public land mobile network (PLMN) identities to which the cell belongs; a CAG identity configured for a cell; or cell broadcast information configured at a DU side, where the cell broadcast information includes at least one of: a CAG identity of a cell or indication information about a cell type.

In a case where multiple cells exist, the indication information about a cell type, the one or more PLMN identities to which a cell belongs, and the CAG identity configured for a cell all refer to relevant information corresponding to each cell.

The indication information about a cell type is used for identifying whether the cell is a close CAG cell, a hybrid CAG cell or a non-CAG cell.

The CU can obtain the configuration information of the CAG cells according to the first configuration information.

Step 202: The CU notifies the one or more DUs of information about an activated CAG cell.

The CU can determine the activated CAG cell according to the obtained configuration information of the CAG cells of the one or more DUs, and thus notify the one or more DUs of the information about the activated CAG cell.

The information about the activated CAG cell may include, but is not limited to, cell identities of one or more activated CAG cells; one or more PLMN identities to which the activated CAG cell belongs; cell broadcast information configured at the CU side, and the like.

In an embodiment, the step 202 includes a step described below.

The CU sends a second feedback message carrying second configuration information to the one or more DUs, and notifies, through the second configuration information, the one or more DUs of the information about the activated CAG cell.

In an embodiment, the second feedback message may include, but is not limited to, an F1 setup response message, a DU configuration update acknowledge message, and a CU configuration update message.

In an embodiment, the second configuration information may include, but is not limited to, at least one of: cell identities of one or more activated CAG cells; one or more PLMN identities to which the activated CAG cell belongs; or cell broadcast information configured at a CU side, where the cell broadcast information includes a cell identity of a neighboring cell and information indicating whether the neighboring cell supports a CAG.

Figure 3:
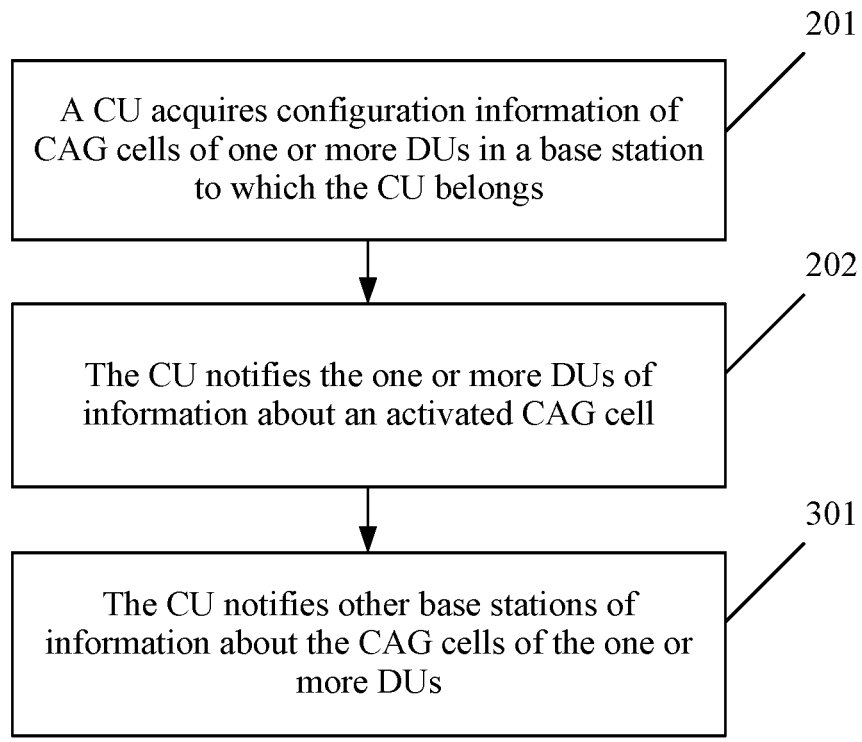
FIG. 3 is a flowchart of a non-public network configuration method according to another embodiment of the present disclosure (applied to a CU)

As shown in FIG. 3, in an embodiment, the method may further include a step 301 after the step 201.

Step 301: The CU notifies other base stations of information about the CAG cells of the one or more DUs.

The CU determines the information about the CAG cells of one or more DUs according to the configuration information of the CAG cells obtained in the step 201, and thus notify other base stations of information about whether the neighboring cells of the cells covered and configured by other base stations support CAGs. The information about the CAG cells may include, but is not limited to, cell identities of the CAG cells, types of the CAG cells, CAG identities configured for the CAG cells, and the like.

In an embodiment, the step 301 includes a step described below.

The CU sends a third message carrying third configuration information to other base stations, where the third configuration information is used for indicating the information about the CAG cells of the one or more DUs.

In an embodiment, the third message includes, but is not limited to, at least one of: an interface setup message between base stations or a node configuration update message between base stations.

The interface between the base stations may be an XN interface.

The node configuration update message between base stations may be interacted through the XN interface.

In an embodiment, the third configuration information includes, but is not limited to, at least one of: one or more cell identities; indication information about a cell type which includes at least one of a close CAG cell, a hybrid CAG cell, or a non-CAG cell; one or more PLMN identities to which the cell belongs; or a CAG identity configured for a cell.

Accordingly, in an embodiment, the method further includes a step described below.

The CU receives a third message carrying third configuration information and sent by another base station, and configures, according to the third configuration information, information about whether a neighboring cell of a cell of the base station to which the CU belongs supports a CAG.

A third message carrying the third configuration information sent by a CU of another base station may be received, so that the information about whether the neighboring cell of the cell covered by the base station itself supports the CAG is configured.

Through the embodiment of the present disclosure, the blank of CAG cell configuration in a CU-DU split network architecture is filled, and the CAG cell configuration of a CU node and a DU node is implemented.

Figure 4:
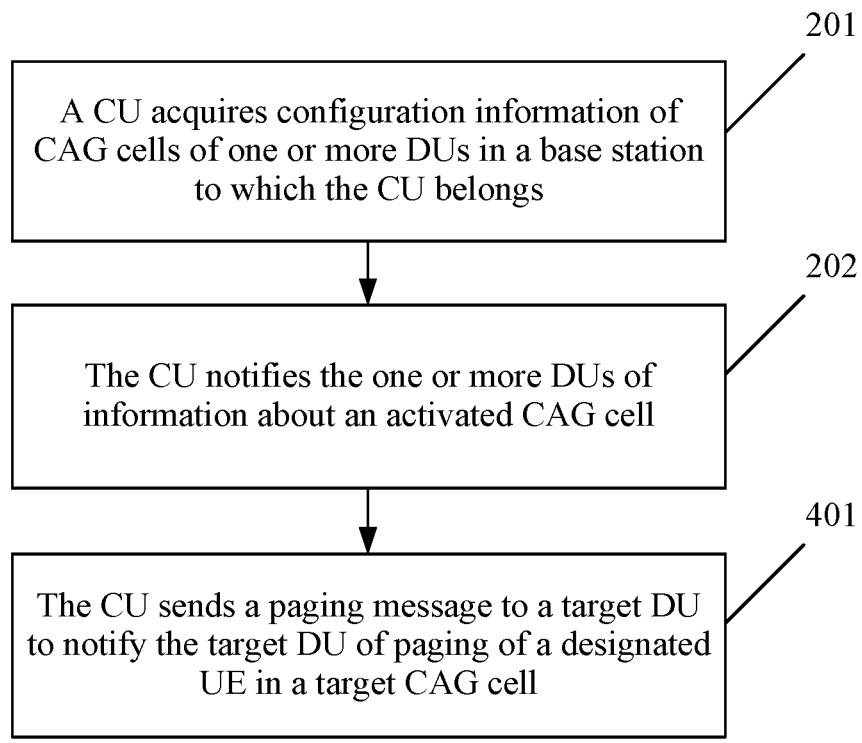
FIG. 4 is a flowchart of a method for paging a UE in accordance with CAG cell configuration according to an embodiment of the present disclosure (applied to a CU)

As shown in FIG. 4, a method for paging a UE in accordance with CAG cell configuration is further provided in the embodiments of the present disclosure. The method is based on the non-public network configuration method and further includes steps described below.

Step 401: The CU sends a paging message to a target DU to notify the target DU of paging of a designated UE in a target CAG cell.

The manner in which the CU determines a to-be-paged target CAG identity may include a manner described below.

Before the step 401, the CU determines the to-be-paged target CAG identity according to one or more CAG identities carried in a received paging message sent by a core network or according to the configuration information of the CAG cells.

The manner in which the CU determines the target DU may include a manner described below.

Before the step 401, the CU determines the target DU according to the configuration information of the CAG cells of the one or more DUs in the base station to which the CU belongs.

In one implementation, the CU may designate the target CAG cell through the paging message, where before the step 401, the CU determines one or more target CAG cells according to the configuration information of the CAG cells of one or more DUs in the base station to which the CU belongs, the paging message carrying cell identities of the one or more target CAG cells.

In another implementation, when the DU determines the target CAG cell, the paging message carries one or more paging cell identities and one or more target CAG identities so that the target DU determines the target CAG cell according to the one or more paging cell identities and the one or more target CAG identities.

Figure 5:
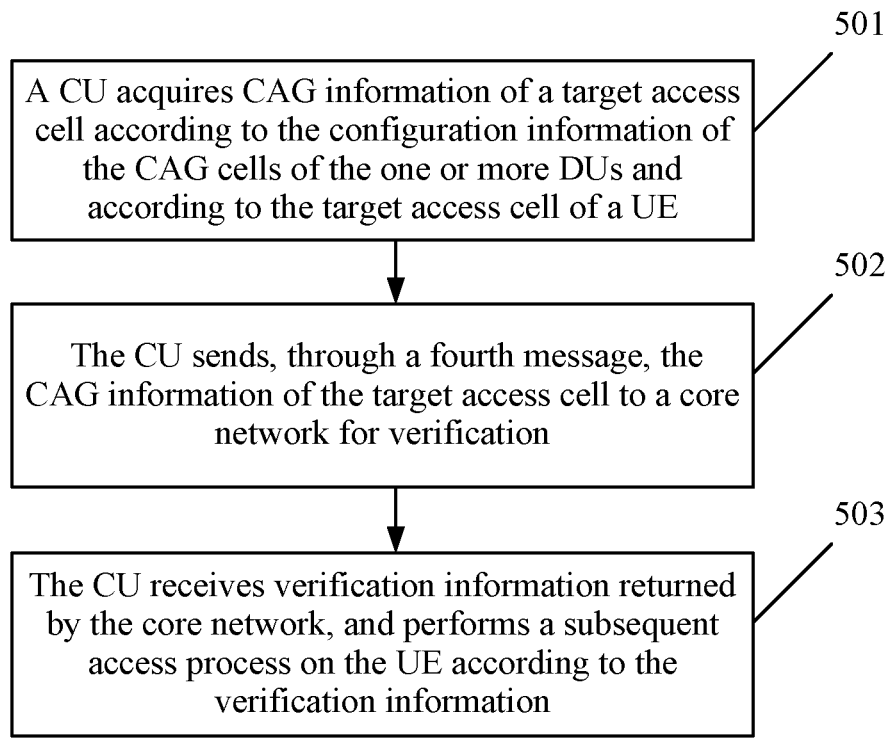
FIG. 5 is a flowchart of a method for performing initial UE access in accordance with CAG cell configuration according to an embodiment of the present disclosure (applied to a CU)

As shown in FIG. 5, a method for performing initial UE access in accordance with CAG cell configuration is further provided in the embodiments of the present disclosure and includes steps described below.

Step 501: The CU acquires CAG information of a target access cell according to the configuration information of the CAG cells of the one or more DUs and according to the target access cell of a UE.

In an embodiment, the CAG information of the target access cell includes, but is not limited to, at least one of: information about a UE identity, an identity of the target access cell, a CAG identity of the target access cell; or information indicating a type of the target access cell.

Step 502: The CU sends, through a fourth message, the CAG information of the target access cell to a core network for verification.

In an embodiment, the fourth message includes, but is not limited to, an initial uplink UE message.

In an embodiment, the verification information includes, but is not limited to, CAG member verification information of the UE, where the CAG member verification information is used for identifying whether the UE is a CAG member of the target access cell.

Step 503: The CU receives verification information returned by the core network, and performs a subsequent access process on the UE according to the verification information.

In an embodiment, the method further includes: after the CU receives the verification information returned by the core network, the CU sends a fifth message to the DU, where the fifth message carries the verification information.

In an embodiment, the fifth message includes, but is not limited to, an F1 UE context setup request.

The cases described below may exist in the step 503.

Case one: The UE is the CAG member of the target access cell.

The CU receives the verification information returned by the core network, and sets up a traffic connection with the UE when determining that the UE is the CAG member of the target access cell.

Case two: The UE is not the CAG member of the target access cell.

1. The target access cell is a close CAG cell.

In such case, the CU hands over the UE to a non-CAG cell or releases a connection with the UE.

2. The target access cell is a hybrid CAG cell.

In such case, the CU hands over the UE to a cell excluding the target access cell, or sets up a traffic connection with the UE and provides a service for the UE at a service level lower than a service level provided for the CAG member.

Figure 6:
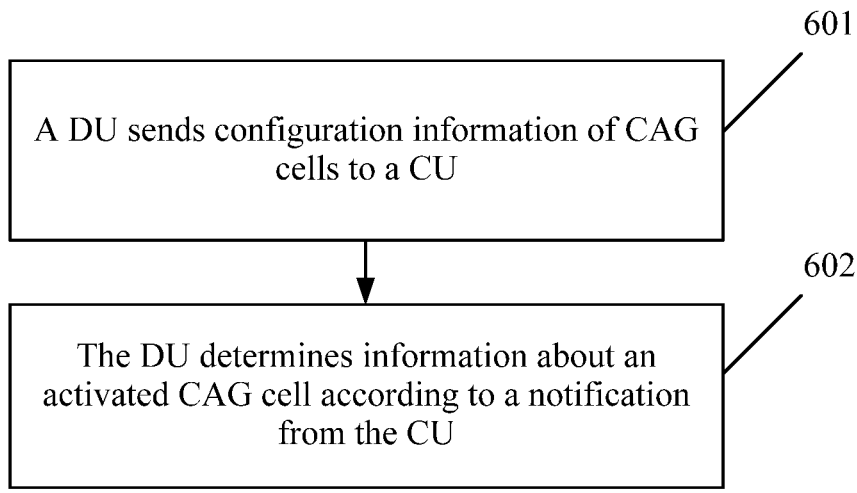
FIG. 6 is a flowchart of a non-public network configuration method according to an embodiment of the present disclosure (applied to a DU)

As shown in FIG. 6, a non-public network configuration method on a DU side provided in the embodiments of the present disclosure includes steps described below.

Step 601: A DU sends configuration information of CAG cells to a CU.

The DU may send the configuration information of the CAG cells through a fronthaul interface between the DU and the CU.

The configuration information of the CAG cells may include, but is not limited to, cell identities of the CAG cells, types of the CAG cells, CAG identities configured for the CAG cells, and the like.

In an embodiment, the step 601 includes a step described below.

The DU sends a first message to the CU, where the first message carries first configuration information including the configuration information of the CAG cells of the DU.

The first message may include, but is not limited to an F1 setup request message, a DU configuration update request message, and the like.

In an embodiment, the first configuration information may include, but is not limited to, at least one of: one or more cell identities; indication information about a cell type which includes at least one of a close CAG cell, a hybrid CAG cell, or a non-CAG cell; one or more PLMN identities to which the cell belongs; a CAG identity configured for a cell; or cell broadcast information configured at a DU side, where the cell broadcast information includes at least one of: a CAG identity of a cell or indication information about a cell type.

In a case where multiple cells exist, the indication information about a cell type, the one or more PLMN identities to which a cell belongs, and the CAG identity configured for a cell all refer to relevant information corresponding to each cell.

The indication information about a cell type is used for identifying whether the cell is a close CAG cell, a hybrid CAG cell or a non-CAG cell.

The CU can obtain the configuration information of the CAG cells according to the first configuration information.

Step 602: The DU determines information about an activated CAG cell according to a notification from the CU.

The information about the activated CAG cell may include, but is not limited to, cell identities of one or more activated CAG cells; one or more PLMN identities to which the activated CAG cell belongs; cell broadcast information configured at the CU side, and the like.

In an embodiment, the step 602 includes a step described below.

The DU receives a second feedback message carrying second configuration information sent by the CU, and determines, through the second configuration information, the information about the activated CAG cell.

In an embodiment, the second feedback message includes, but is not limited to, at least one of: an F1 setup response message, a DU configuration update acknowledge message, or a CU configuration update message.

In an embodiment, the second configuration information includes, but is not limited to, at least one of: cell identities of one or more activated CAG cells; one or more PLMN identities to which the activated CAG cell belongs; or cell broadcast information configured at a CU side, where the cell broadcast information includes a cell identity of a neighboring cell and information indicating whether the neighboring cell supports a CAG.

Figure 7:
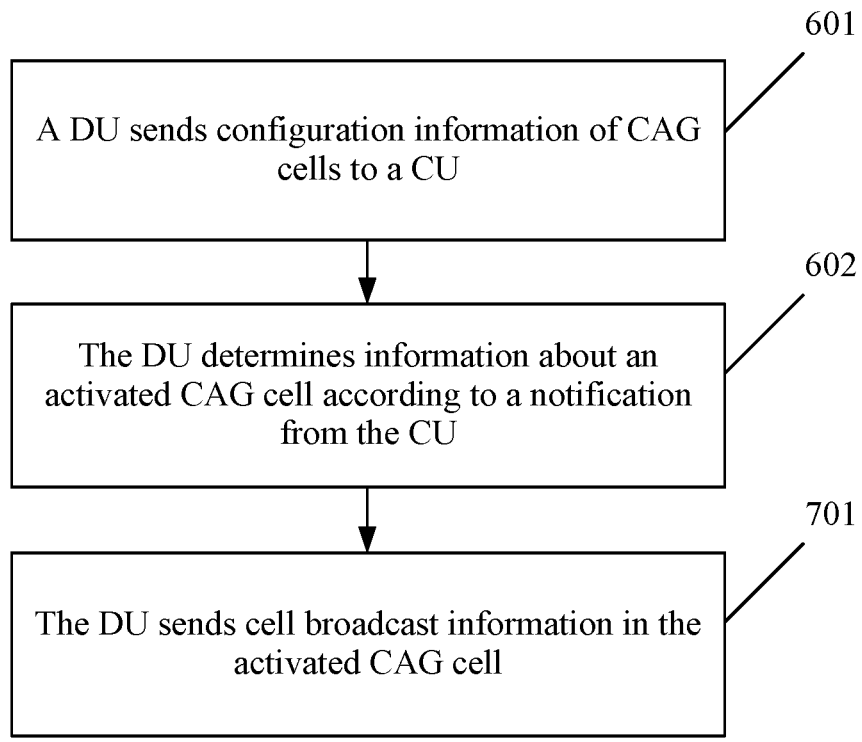
FIG. 7 is a flowchart of a non-public network configuration method according to another embodiment of the present disclosure (applied to a DU)

As shown in FIG. 7, in an embodiment, the method may further include a step 701 after the step 602.

Step 701: The DU sends cell broadcast information in the activated CAG cell.

In an embodiment, the cell broadcast information includes, but is not limited to, at least one of: corresponding cell broadcast information configured at a DU side; or corresponding cell broadcast information configured at a CU side, where the corresponding cell broadcast information configured at the CU side includes a cell identity of a neighboring cell and an indication of whether the neighboring cell supports a CAG.

The corresponding cell broadcast information configured at the CU side is the corresponding cell broadcast information configured at the CU side in the second configuration information.

Figure 8:
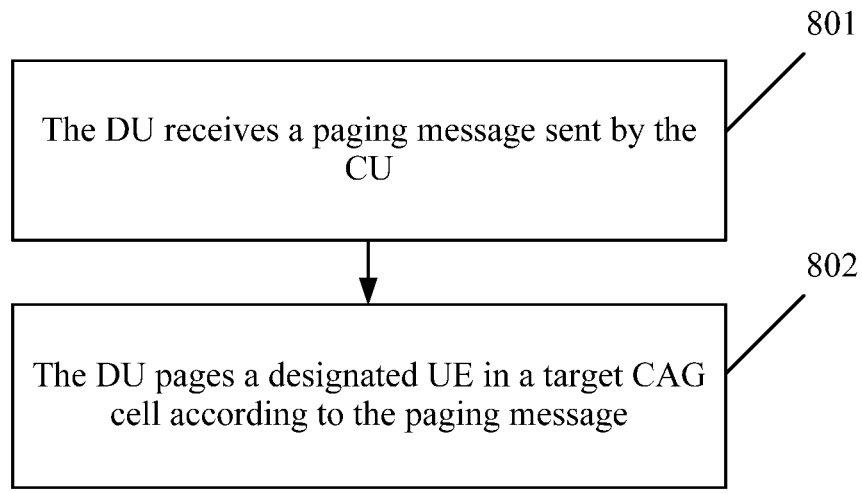
FIG. 8 is a flowchart of a method for paging a UE in accordance with CAG cell configuration according to an embodiment of the present disclosure (applied to a DU)

As shown in FIG. 8, a method for paging a UE in accordance with CAG cell configuration is further provided in the embodiments of the present disclosure. The method is based on the non-public network configuration method and further includes steps described below.

Step 801: The DU receives a paging message sent by the CU.

The paging message carries cell identities of one or more target CAG cells, or the paging message carries one or more paging cell identities and one or more target CAG identities.

Step 802: The DU pages a designated UE in a target CAG cell according to the paging message.

When the paging message carries cell identities of one or more target CAG cells, the DU pages, according to the paging message, the designated UE in the target CAG cell designated by the paging message.

When the paging message carries one or more paging cell identities and one or more target CAG identities, the DU determines the target CAG cell according to the one or more paging cell identities and the one or more target CAG identities, and pages the designated UE in the target CAG cell.

Figure 9:
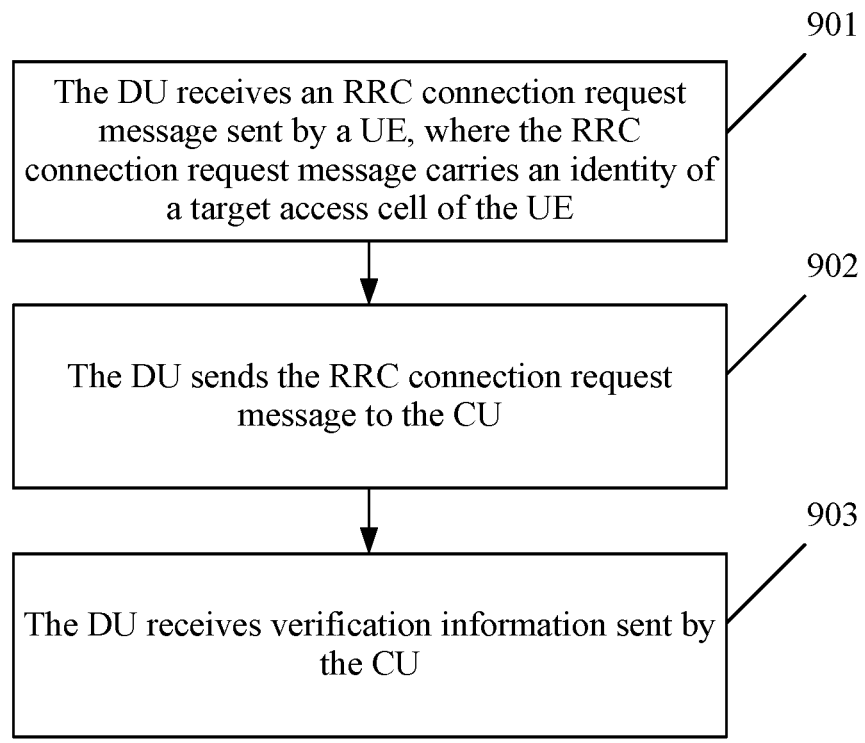
FIG. 9 is a flowchart of a method for performing initial UE access in accordance with CAG cell configuration according to an embodiment of the present disclosure (applied to a DU)

As shown in FIG. 9, a method for performing initial UE access in accordance with CAG cell configuration is further provided in the embodiments of the present disclosure and includes steps described below.

Step 901: The DU receives a radio resource control (RRC) connection request message sent by a UE, where the RRC connection request message carries an identity of a target access cell of the UE.

Step 902: The DU sends the RRC connection request message to the CU.

Step 903: The DU receives verification information sent by the CU.

In an embodiment, the step in which the DU receives the verification information sent by the CU includes: the DU receives a fifth message sent by the CU, where the fifth message carries the verification information. The fifth message includes, but is not limited to, an F1 UE context setup request. The verification information includes CAG member verification information of the UE, and the CAG member verification information is used for identifying whether the UE is a CAG member of the target access cell.

Several application examples are described below. It is to be noted the name CAG is only a name for non-public networks, and non-public networks may also be represented by other names.

APPLICATION EXAMPLE ONE: CAG INFORMATION CONFIGURATION IN AN F1 SETUP PROCESS

Figure 10:
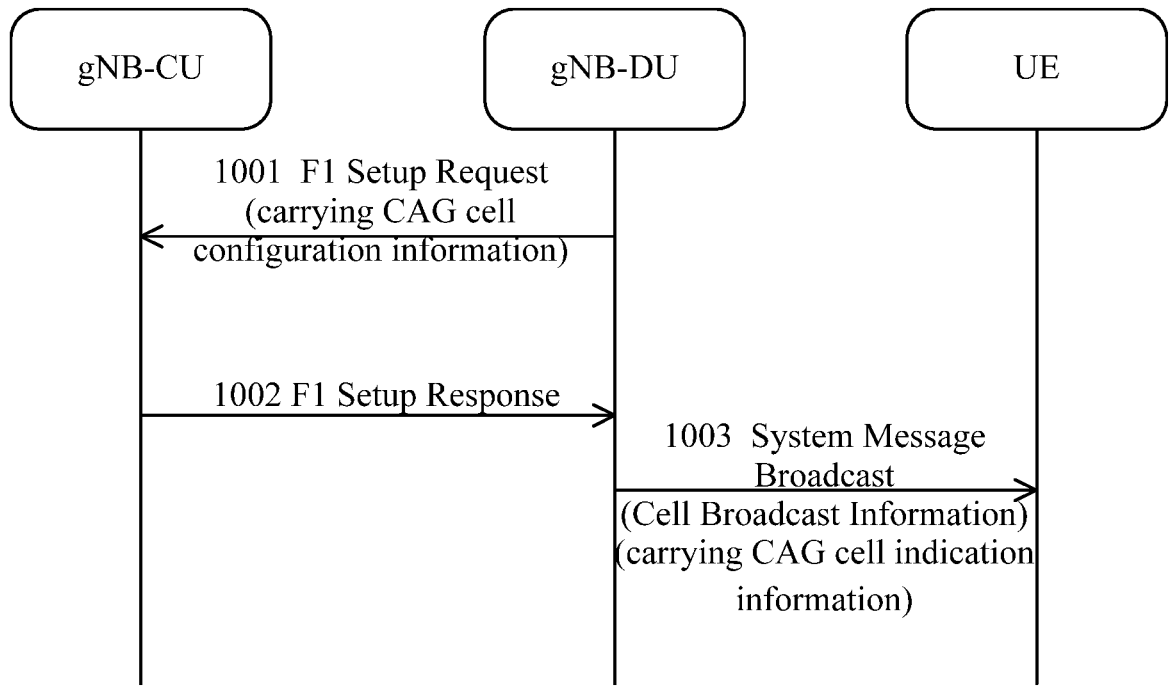
FIG. 10 is a flowchart of CAG information configuration in an F1 setup process according to application example one of the present disclosure.

As shown in FIG. 10, the process includes the steps described below.

Step 1001: A CU receives an F1 setup message sent by a DU. The message carries configuration information of CAG cells of the DU. The configuration information includes at least one of: one or more cell identities; a corresponding cell type indication for identifying whether a cell is a hybrid CAG cell, a close CAG cell, or a non-CAG cell; one or more PLMN IDs to which a corresponding cell belongs; a CAG ID configured for a corresponding cell; or cell broadcast information configured at a DU side, where the cell broadcast information includes the CAG ID of the corresponding cell and the corresponding cell type indication for identifying whether the cell is a hybrid CAG cell, a close CAG cell or a non-CAG cell.

Step 1002: The CU sends an F1 setup response message to the DU. The message carries configuration information used for notifying the DU of an available activated CAG cell (i.e., activated CAG cell). The configuration information includes at least one of: cell identities of one or more activated CAG cells; one or more PLMN IDs to which the corresponding cell belongs; or cell broadcast information configured at a CU side, where the cell broadcast information includes a cell identity of a neighboring cell of the corresponding cell and an indication of whether the neighboring cell supports a CAG.

Step 1003: The DU sends the cell broadcast information over the activated cell according to the F1 setup response message. The cell broadcast information includes corresponding cell broadcast information configured at the CU side in the F1 setup response message and corresponding cell broadcast information configured at the DU side. The corresponding cell broadcast information configured at the CU side includes the cell identity of the neighboring cell of the corresponding cell and the indication of whether the neighboring cell supports a CAG.

APPLICATION EXAMPLE TWO: CAG INFORMATION CONFIGURATION IN A DU CONFIGURATION UPDATE PROCESS

Figure 11:
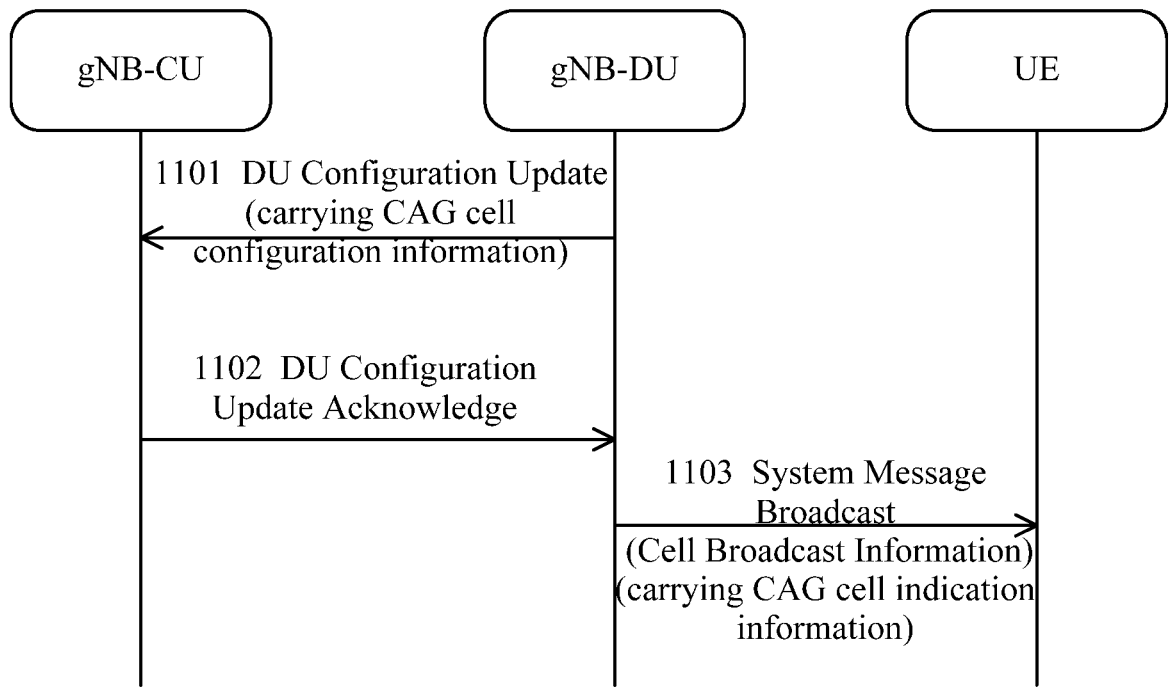
FIG. 11 is a flowchart of CAG information configuration in a DU configuration update process according to application example two of the present disclosure.

As shown in FIG. 11, the process includes the steps described below.

Step 1101: ACU receives a DU configuration update message sent by a DU. The message carries configuration information of CAG cells of the DU. The configuration information includes at least one of: one or more cell identities; a corresponding cell type indication for identifying whether a cell is a hybrid CAG cell, a close CAG cell, or a non-CAG cell; one or more PLMN IDs to which a corresponding cell belongs; a CAG ID configured for a corresponding cell; or cell broadcast information configured at a DU side, where the cell broadcast information includes the CAG ID of the corresponding cell and the corresponding cell type indication for identifying whether the cell is a hybrid CAG cell, a close CAG cell or a non-CAG cell.

Step 1102: The CU sends a DU configuration update acknowledge message to the DU. The message carries configuration information used for notifying the DU of an available activated CAG cell (i.e., activated CAG cell). The configuration information includes at least one of: cell identities of one or more activated CAG cells; one or more PLMN IDs to which the corresponding cell belongs; or cell broadcast information configured at a CU side, where the cell broadcast information includes a cell identity of a neighboring cell of the corresponding cell and an indication of whether the neighboring cell supports a CAG.

Step 1103: The DU sends the cell broadcast information over the activated cell according to the DU configuration update acknowledge message. The cell broadcast information includes corresponding cell broadcast information configured at the CU side in the DU configuration update acknowledge message and corresponding cell broadcast information configured at the DU side. The corresponding cell broadcast information configured at the CU side includes the cell identity of the neighboring cell of the corresponding cell and the indication of whether the neighboring cell supports a CAG.

APPLICATION EXAMPLE THREE: CAG INFORMATION CONFIGURATION IN A CU CONFIGURATION UPDATE PROCESS

Figure 12:
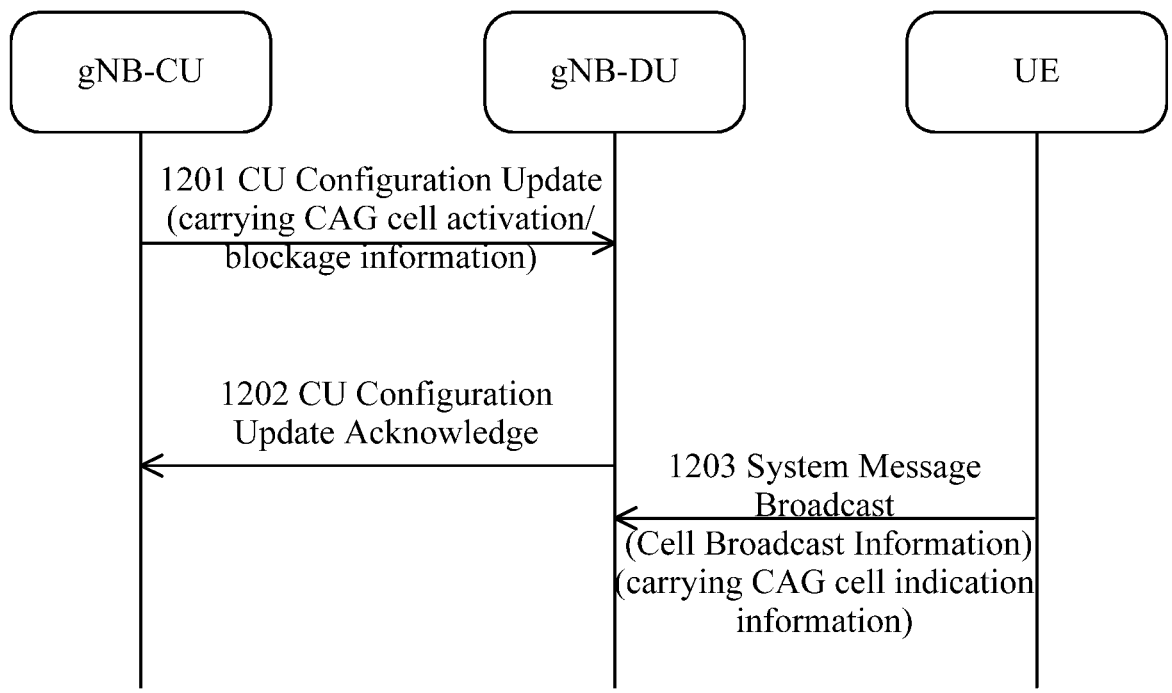
FIG. 12 is a flowchart of CAG information configuration in a CU configuration update process according to application example three of the present disclosure.

As shown in FIG. 12, the process includes the steps described below.

Step 1201: A CU sends a CU configuration update message to a DU. The message carries configuration information used for notifying the DU of an available activated CAG cell. The configuration information includes at least one of: cell identities of one or more activated CAG cells; one or more PLMN IDs to which a corresponding cell belongs; or cell broadcast information configured at a CU side, where the cell broadcast information includes a cell identity of a neighboring cell of the corresponding cell and an indication of whether the neighboring cell supports a CAG.

Step 1202: The DU sends a CU configuration update acknowledge message to the CU.

Step 1203: The DU sends cell broadcast information over the activated cell according to the CU configuration update message. The cell broadcast information includes corresponding cell broadcast information configured at a DU side and corresponding cell broadcast information configured at the CU side. The corresponding cell broadcast information configured at the CU side includes the cell identity of the neighboring cell of the corresponding cell and the indication of whether the neighboring cell supports a CAG.

APPLICATION EXAMPLE FOUR: PAGING PROCESS TRIGGERED BY A RADIO ACCESS NETWORK (RAN)

Figure 13:
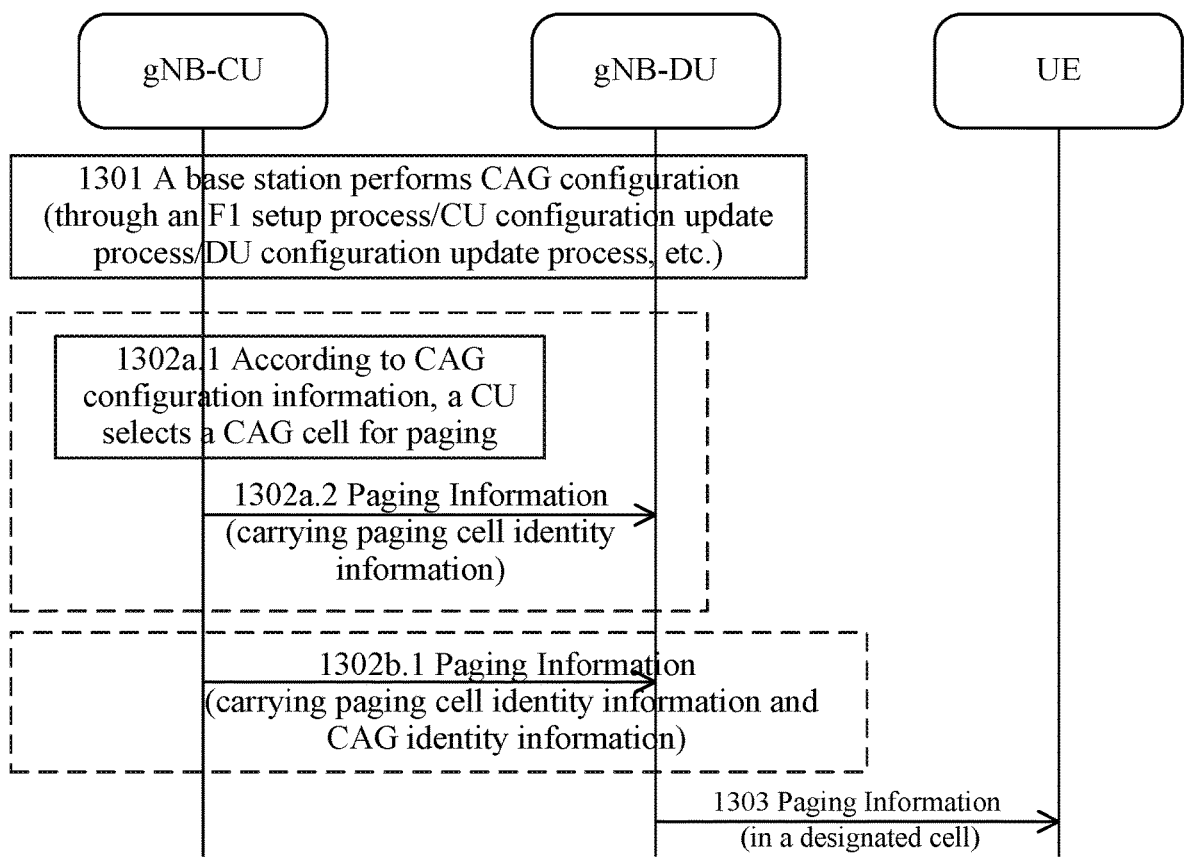
FIG. 13 is a flowchart of a CAG cell paging process triggered by a radio access network (RAN) according to application example four of the present disclosure.

As shown in FIG. 13, the process includes the steps described below.

Step 1301: A CU acquires configuration of CAG cells belonging to a plurality of DUs, and determines a to-be-paged target CAG ID according to the configuration of the CAG cells belonging to the plurality of DUs.

Optional step 1302: (The main purpose of this step is to screen a target paging cell by the CU according to the CAG ID); in step 1302*a*.1, the CU determines, according to the configuration of the CAG cells belonging to the plurality of DUs, the target paging cell to be the cell configured with the to-be-paged target CAG ID, that is, a target CAG cell. In step 1302*a*.2, the CU sends a paging message to the DU, the message carrying one or more target paging cell identities determined by the CU.

Optional step 1302: (The main purpose of this step is to screen a target paging cell by the DU according to the CAG ID); in step 1302*b*.1, the CU sends a paging message to the DU, the message carrying one or more paging cell identities and one or more target CAG IDs.

Step 1303: The DU receives the paging message. Optionally, the DU determines the target paging cell from paging cells carried in the corresponding paging message according to the target CAG ID carried in the paging message, or the DU determines the target paging cell according to a target paging cell designated by the paging message; and the DU pages a UE in the target paging cell.

APPLICATION EXAMPLE FIVE: PAGING PROCESS TRIGGERED BY A CORE NETWORK

Figure 14:
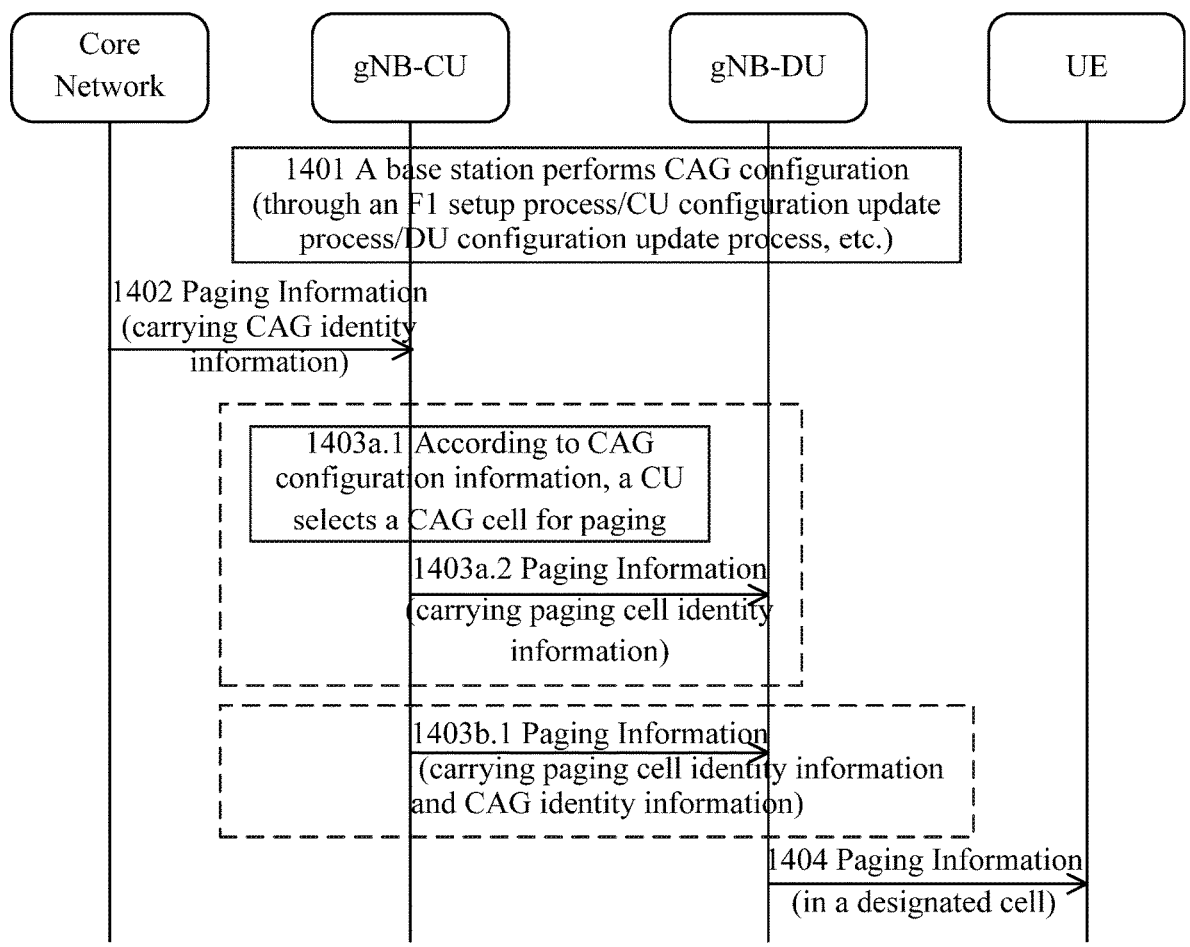
FIG. 14 is a flowchart of a CAG cell paging process triggered by a core network according to application example five of the present disclosure.

As shown in FIG. 14, the process includes the steps described below.

Step 1401: A CU acquires configuration of CAG cells belonging to a plurality of DUs.

Step 1402: The CU receives a core network paging message, where the core network paging message carries one or more to-be-paged CAG IDs. The CU determines a to-be-paged target CAG ID according to the one or more to-be-paged CAG IDs carried in the core network paging message.

Optional step 1403: (The main purpose of this step is to screen a target paging cell by the CU according to the CAG ID); in step 1403*a*.1, the CU determines, according to the configuration of the CAG cells belonging to the plurality of DUs, the target paging cell to be the cell configured with the to-be-paged target CAG ID, that is, a target CAG cell. In step 1403*a*.2, the CU sends a paging message to the DU, the message carrying one or more target paging cell identities determined by the CU.

Optional step 1403: (The main purpose of this step is to screen a target paging cell by the DU according to the CAG ID); in step 1403*b*.1, the CU sends a paging message to the DU, the message carrying one or more paging cell identities and one or more target CAG IDs.

Step 1404: The DU receives the paging message; optionally, the DU determines the target paging cell from paging cells carried in the corresponding paging message according to the target CAG ID carried in the paging message, or the DU determines the target paging cell according to a target paging cell designated by the paging message; and the DU pages a UE in the target paging cell.

APPLICATION EXAMPLE SIX: ACCORDING TO CAG CONFIGURATION INFORMATION, A CU NOTIFIES A CORE NETWORK OF VERIFICATION DURING A UE ACCESS PROCESS

Figure 15:
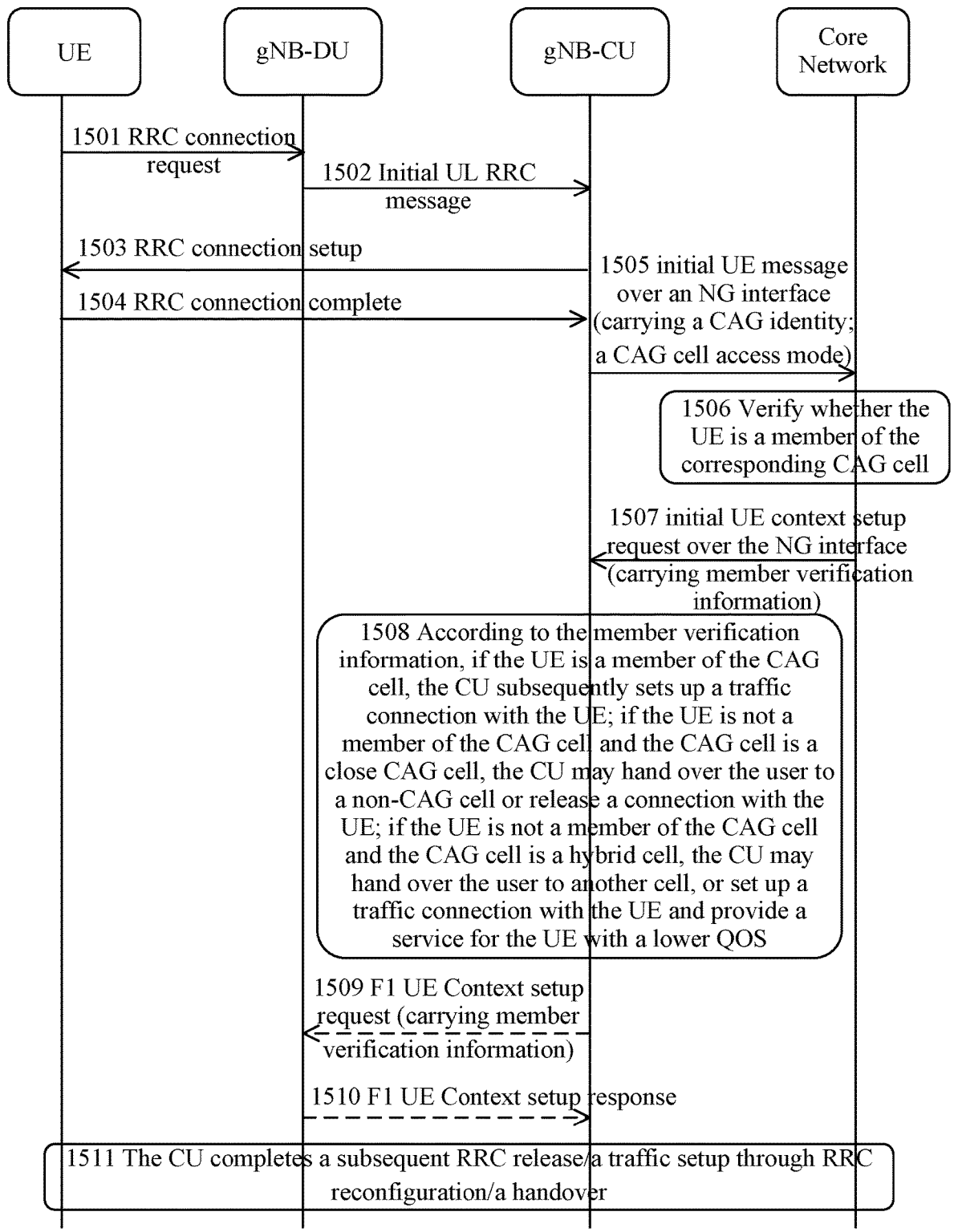
FIG. 15 is a flowchart in which a CU notifies, in accordance with CAG configuration information, a core network of verification in a UE access process according to application example six of the present disclosure.

As shown in FIG. 15, the process includes the steps described below.

Step 1501: A UE sends an RRC connection request message to a DU, where the message carries a target cell ID.

Step 1502: The DU determines whether to admit, and sends the RRC connection request message to a CU through an initial uplink RRC message.

Step 1503: The CU sends an RRC connection setup message to the UE.

Step 1504: The UE sends an RRC connection complete message to the CU.

Step 1505: The CU acquires CAG information of a target access cell according to configuration of CAG cells of a plurality of DUs and a target cell indicated in the RRC connection request from the UE, and sends, through an initial uplink UE message, the CAG information of the target cell to the core network for verification. The CAG information of the target cell includes at least one of: information about a user identity; an identity of the target cell; a CAG ID of the target cell; or a target cell type indication for identifying whether the cell is a hybrid CAG cell, a close CAG cell or a non-CAG cell.

Step 1506: The core network verifies whether the user is the CAG member according to the CAG information of the target access cell.

Step 1507: The core network sends an NG UE context setup request message to the CU. The message carries CAG member verification information of the user, and the CAG member verification information is used for identifying whether the UE is a CAG member of the target cell.

Step 1508: According to the member verification information returned by the core network, if the UE is a member of the CAG cell, the CU subsequently sets up a traffic connection with the UE; if the UE is not a member of the CAG cell and the CAG cell is a close CAG cell, the CU may hand over the user to a non-CAG cell or release a connection with the UE; if the UE is not a member of the CAG cell and the CAG cell is a hybrid cell, the CU may hand over the user to another cell, or set up a traffic connection with the UE and provide a service for the UE with a lower Quality of Service (QOS).

Step 1509: The CU sends an F1 UE context setup request message to the DU. The message carries CAG member verification information of the user fed back by the core network, and the CAG member verification information is used for notifying the DU of whether the UE is a CAG member of the target cell.

Step 1510: The DU returns an F1 UE context setup response message to the CU.

Step 1511: According to the determination in the step 1508 and according to the different CAG member verification cases, a subsequent RRC release is completed/a traffic setup is completed through RRC reconfiguration/a handover is completed.

APPLICATION EXAMPLE SEVEN: INTERACTIVE CAG INFORMATION CONFIGURATION IN AN INTERFACE SETUP PROCESS BETWEEN BASE STATIONS

Figure 16:
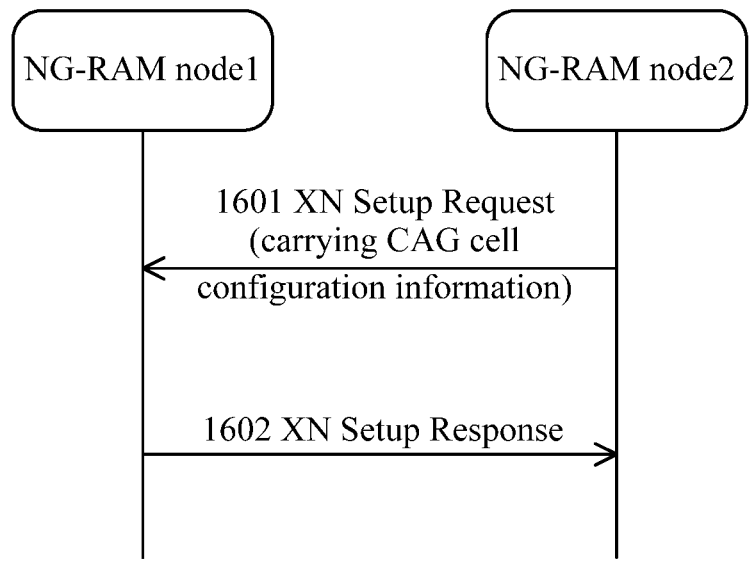
FIG. 16 is a flowchart of interactive CAG information configuration in an interface setup process between base stations according to application example seven of the present disclosure.

As shown in FIG. 16, the process includes the steps described below.

Step 1601: A base station (NODE1) sends an XN interface setup message to another base station (NODE2). The message carries configuration information used for indicating CAG cell information of the base station (NODE1). The configuration information includes at least one of: one or more cell identities; a corresponding cell type indication for identifying whether a cell is a hybrid CAG cell, a close CAG cell, or a non-CAG cell; one or more PLMN IDs to which a corresponding cell belongs; or a CAG ID configured for a corresponding cell.

Step 1602: The base station (NODE2) receives the XN interface setup request message, configures, according to CAG cell configuration information carried in the message, whether the neighboring cell of a cell of the base station (NODE2) supports a CAG, and returns an XN setup response message to the base station (NODE1).

APPLICATION EXAMPLE EIGHT: INTERACTIVE CAG INFORMATION CONFIGURATION IN A BASE STATION CONFIGURATION UPDATE PROCESS

Figure 17:
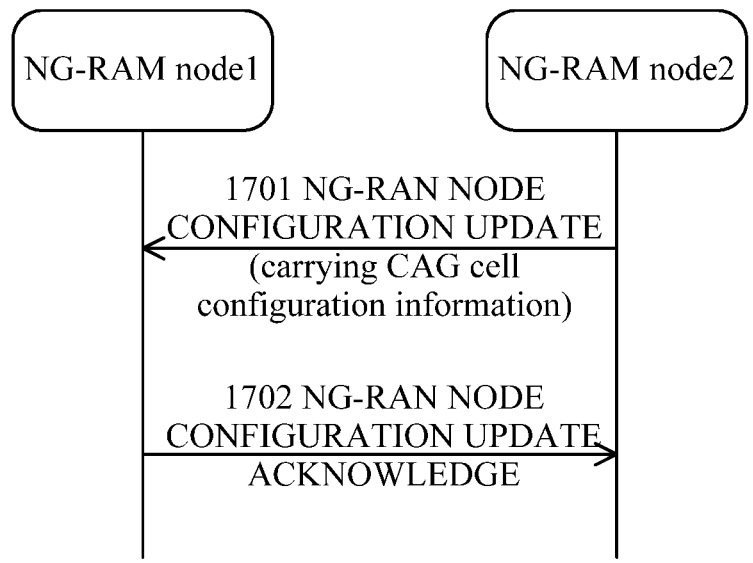
FIG. 17 is a flowchart of interactive CAG information configuration in a base station configuration update process according to application example eight of the present disclosure.

As shown in FIG. 17, the process includes the steps described below.

Step 1701: A base station (NODE1) sends a node configuration update message to another base station (NODE2). The message carries configuration information used for indicating CAG cell information of the base station (NODE1). The configuration information includes at least one of: one or more cell identities; a corresponding cell type indication for identifying whether a cell is a hybrid CAG cell, a close CAG cell, or a non-CAG cell; one or more PLMN IDs to which a corresponding cell belongs; or a CAG ID configured for a corresponding cell.

Step 1702: The base station (NODE2) receives the node configuration update message, configures, according to CAG cell configuration information carried in the message, whether the neighboring cell of a cell of the base station (NODE2) supports a CAG, and returns a node configuration update acknowledge message to the base station (NODE1).

Figure 18:
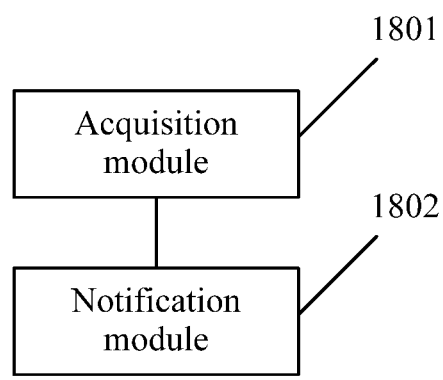
FIG. 18 is a schematic diagram of a non-public network configuration apparatus according to an embodiment of the present disclosure (applied to a CU)

As shown in FIG. 18, a non-public network configuration apparatus applied to a CU is further provided in the embodiments of the present disclosure. The apparatus includes an acquisition module 1801 and a notification module 1802. The acquisition module 1801 is configured to acquire configuration information of closed access group (CAG) cells of one or more distributed units (DUs) in a base station to which the acquisition module 1801 belongs. The notification module 1802 is configured to notify the one or more DUs of information about an activated CAG cell.

Through the embodiment of the present disclosure, the blank of CAG cell configuration in a CU-DU split network architecture is filled, and the CAG cell configuration of a CU node and a DU node is implemented.

In an embodiment, the acquisition module 1801 is configured to acquire the configuration information of the CAG cells through a fronthaul interface between the sending module 1901 and the one or more CUs.

In an embodiment, the acquisition module 1801 is configured to receive a first message sent by the one or more DUs, where the first message carries first configuration information including the configuration information of the CAG cells of the one or more DUs.

In an embodiment, the first message includes at least one of: an F1 setup request message or a DU configuration update request message.

In an embodiment, the first configuration information includes at least one of: one or more cell identities; indication information about a cell type which includes at least one of a close CAG cell, a hybrid CAG cell, or a non-CAG cell; one or more PLMN identities to which the cell belongs; a CAG identity configured for a cell; or cell broadcast information configured at a DU side, where the cell broadcast information includes at least one of: a CAG identity of a cell or indication information about a cell type.

In an embodiment, the notification module 1802 is configured to send a second feedback message carrying second configuration information to the one or more DUs, and notify, through the second configuration information, the one or more DUs of the information about the activated CAG cell.

In an embodiment, the second feedback message includes at least one of: an F1 setup response message, a DU configuration update acknowledge message, or a CU configuration update message.

In an embodiment, the second configuration information includes at least one of: cell identities of one or more activated CAG cells; one or more PLMN identities to which the activated CAG cell belongs; or cell broadcast information configured at a CU side, where the cell broadcast information includes a cell identity of a neighboring cell and information indicating whether the neighboring cell supports a CAG.

In an embodiment, the notification module 1802 is further configured to notify other base stations of information about the CAG cells of the one or more DUs.

In an embodiment, the notification module 1802 is configured to enable a CU to send a third message carrying third configuration information to other base stations, where the third configuration information is used for indicating the information about the CAG cells of the one or more DUs.

In an embodiment, the third message includes at least one of: an interface setup message between base stations or a node configuration update message between base stations.

In an embodiment, the third configuration information includes at least one of: one or more cell identities; indication information about a cell type which includes at least one of a close CAG cell, a hybrid CAG cell, or a non-CAG cell; one or more PLMN identities to which the cell belongs; or a CAG identity configured for a cell.

In an embodiment, the acquisition module 1801 is further configured to receive a third message carrying third configuration information and sent by another base station, and configure, according to the third configuration information, information about whether a neighboring cell of a cell of the base station to which the acquisition module 1801 belongs supports a CAG.

In an embodiment, the notification module 1802 is further configured to enable the CU to send a paging message to a target DU to notify the target DU of paging of a designated user equipment (UE) in a target CAG cell.

In an embodiment, the notification module 1802 is further configured to determine a to-be-paged target CAG identity according to one or more CAG identities carried in a received paging message sent by a core network or according to the configuration information of the CAG cells.

In an embodiment, the notification module 1802 is further configured to determine a target DU according to the configuration information of the CAG cells of the one or more DUs in the base station to which the notification module 1802 belongs.

In an embodiment, the notification module 1802 is further configured to determine one or more target CAG cells according to the configuration information of the CAG cells of one or more DUs in the base station to which the notification module 1802 belongs, the paging message carrying cell identities of the one or more target CAG cells.

In an embodiment, the paging message carries one or more paging cell identities and one or more target CAG identities so that the target DU determines the target CAG cell according to the one or more paging cell identities and the one or more target CAG identities.

In an embodiment, the acquisition module 1801 is further configured to acquire CAG information of a target access cell according to the configuration information of the CAG cells of the one or more DUs and according to the target access cell of a UE.

The notification module 1802 is further configured to send, through a fourth message, the CAG information of the target access cell to a core network for verification. The apparatus further includes an access module configured to receive verification information returned by the core network, and perform a subsequent access process on the UE according to the verification information.

In an embodiment, the CAG information of a target cell includes at least one of: information about a user identity, an identity of the target cell, a CAG identity of the target cell; or information indicating a type of the target cell.

In an embodiment, the fourth message includes an initial uplink UE message.

In an embodiment, the verification information includes CAG member verification information of the UE, where the CAG member verification information is used for identifying whether the UE is a CAG member of the target access cell.

In an embodiment, the notification module 1802 is further configured to send a fifth message to the DU, where the fifth message carries the verification information.

In an embodiment, the fifth message includes an F1 UE context setup request.

In an embodiment, the access module is configured to: in a case where the UE is the CAG member of the target access cell, set up a traffic connection with the UE; in a case where the UE is not the CAG member of the target access cell and the target access cell is a close CAG cell, hand over the UE to a non-CAG cell or release a connection; or in a case where the UE is not the CAG member of the target access cell and the target access cell is a hybrid CAG cell, hand over the UE to a cell excluding the target access cell, or set up a traffic connection with the UE and provide a service for the UE at a service level lower than a service level provided for the CAG member.

Figure 19:
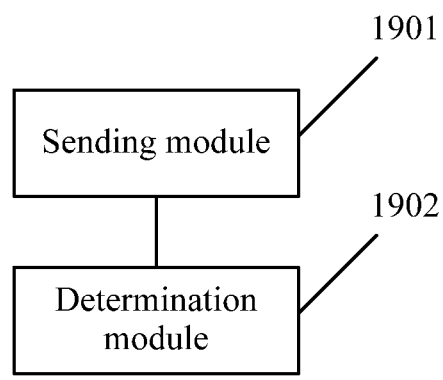
FIG. 19 is a schematic diagram of a non-public network configuration apparatus according to an embodiment of the present disclosure (applied to a DU)

As shown in FIG. 19, a non-public network configuration apparatus applied to a DU is further provided in the embodiments of the present disclosure. The apparatus includes a sending module 1901 configured to send configuration information of closed access group (CAG) cells to a centralized unit (CU) and a determination module 1902 configured to determine information about an activated CAG cell according to a notification from the CU.

Through the embodiment of the present disclosure, the blank of CAG cell configuration in a CU-DU split network architecture is filled, and the CAG cell configuration of a CU node and a DU node is implemented.

In an embodiment, the sending module 1901 is configured to send the configuration information of the CAG cells through a fronthaul interface between the sending module 1901 and the CU.

In an embodiment, the sending module 1901 is configured to enable the DU to send a first message to the CU, where the first message carries first configuration information including the configuration information of the CAG cells of the DU.

In an embodiment, the first message includes at least one of: an F1 setup request message or a DU configuration update request message.

In an embodiment, the first configuration information includes at least one of: one or more cell identities; indication information about a cell type which includes at least one of a close CAG cell, a hybrid CAG cell, or a non-CAG cell; one or more PLMN identities to which the cell belongs; a CAG identity configured for a cell; or cell broadcast information configured at a DU side, where the cell broadcast information includes at least one of: a CAG identity of a cell or indication information about a cell type.

In an embodiment, the determination module 1902 is configured to enable the DU to receive a second feedback message carrying second configuration information and sent by the CU, and determine, through the second configuration information, the information about the activated CAG cell.

In an embodiment, the second feedback message includes at least one of: an F1 setup response message, a DU configuration update acknowledge message, or a CU configuration update message.

In an embodiment, the second configuration information includes at least one of: cell identities of one or more activated CAG cells; one or more PLMN identities to which the activated CAG cell belongs; or cell broadcast information configured at a CU side, where the cell broadcast information includes a cell identity of a neighboring cell and information indicating whether the neighboring cell supports a CAG.

In an embodiment, the sending module 1901 is further configured to send cell broadcast information in the activated CAG cell.

In an embodiment, the cell broadcast information includes at least one of: corresponding cell broadcast information configured at a DU side; or corresponding cell broadcast information configured at a CU side, where the corresponding cell broadcast information configured at the CU side includes a cell identity of a neighboring cell and an indication of whether the neighboring cell supports a CAG.

In an embodiment, the apparatus further includes a receiving module and a paging module. The receiving module is configured to receive a paging message sent by the CU.

The paging module is configured to page a designated user equipment (UE) in a target CAG cell according to the paging message.

In an embodiment, the paging module is configured to page, according to cell identities of one or more target CAG cells carried in the paging message, the designated UE in the target CAG cell designated by the paging message.

In an embodiment, the paging module is configured to determine the target CAG cell according to one or more paging cell identities and one or more target CAG identities carried in the paging message, and pages the designated UE in the target CAG cell.

In an embodiment, the receiving module is further configured to receive a radio resource control (RRC) connection request message sent by a UE, where the RRC connection request message carries an identity of a target access cell of the UE; the sending module 1901 is further configured to send the RRC connection request message to the CU; and the receiving module is further configured to receive verification information sent by the CU.

In an embodiment, the receiving module is configured to enable the DU to receive a fifth message sent by the CU, where the fifth message carries the verification information. The fifth message includes an F1 UE context setup request. The verification information includes CAG member verification information of the UE, and the CAG member verification information is used for identifying whether the UE is a CAG member of the target access cell.

Figure 20:
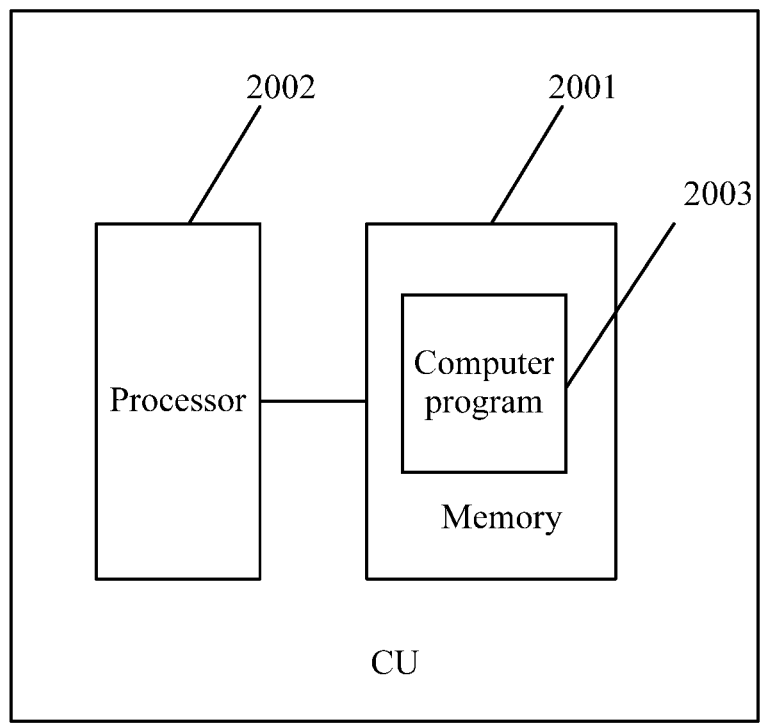
FIG. 20 is a schematic diagram of a CU according to an embodiment of the present disclosure.

As shown in FIG. 20, a CU is further provided in the embodiments of the present disclosure. The CU includes a memory 2001, a processor 2002, and a computer program 2003 stored in the memory 2001 and executable by the processor 2002. When executing the program, the processor 2002 implements the non-public network configuration method.

Figure 21:
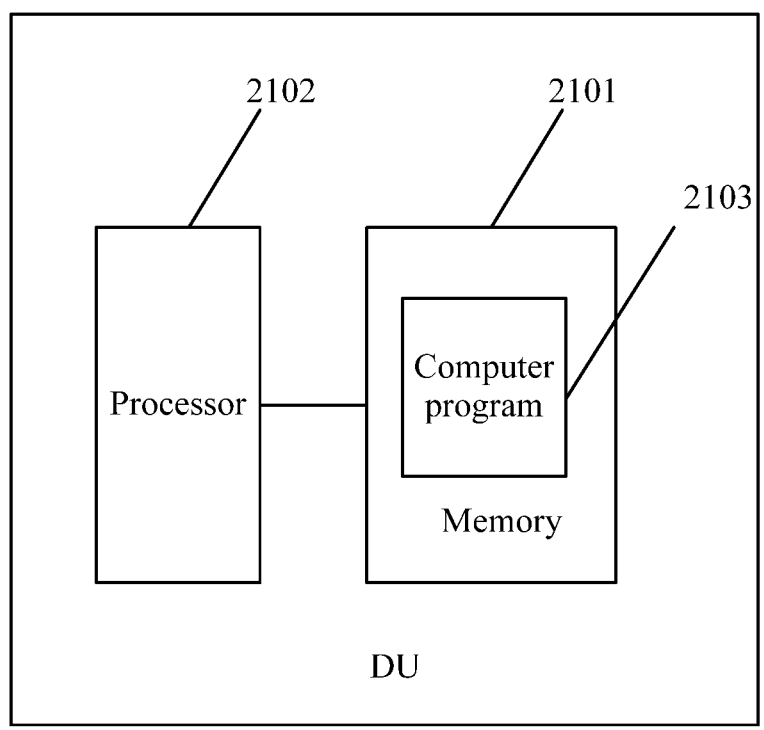
FIG. 21 is a schematic diagram of a DU according to an embodiment of the present disclosure.

As shown in FIG. 21, a DU is further provided in the embodiments of the present disclosure. The DU includes a memory 2101, a processor 2102, and a computer program 2103 stored in the memory 2101 and executable by the processor 2102. When executing the program, the processor 2102 implements the non-public network configuration method.

A base station is further provided in the embodiments of the present disclosure and includes the CU and one or more DUs.

A computer-readable storage medium is further provided in the embodiments of the present disclosure and is configured to store computer-executable instructions for executing the non-public network configuration method.

In the embodiment, the storage medium may include, but is not limited to, a universal serial bus flash disk, a read-only memory (ROM), a random access memory (RAM), a mobile hard disk, a magnetic disk, an optical disk or another medium capable of storing program codes.

It is to be understood by those of ordinary skill in the art that all or some of the steps and systems in the methods disclosed herein and all or some of the functional modules/units in the apparatuses disclosed herein may be implemented as software, firmware, hardware or a suitable combination thereof. In the hardware implementation, the division of the functional modules/units mentioned above may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a RAM, a ROM, an electrically erasable programmable read-only memory (EEPROM), a flash memory, or other memory technologies, a compact disc read-only memory (CD-ROM), a digital video disc (DVD) or other optical disc memories, magnetic cassettes, magnetic tapes, magnetic disk memories or other magnetic storage apparatuses, or any other medium used for storing the desired information and accessible by a computer. Moreover, it is known to those of ordinary skill in the art that communication media typically include computer-readable instructions, data structures, program modules or other data in modulated data signals such as carrier waves or other transport mechanisms and may include any information delivery medium.

What is claimed is:

1. A non-public network configuration method, comprising:
   acquiring, by a centralized unit (CU), configuration information of closed access group (CAG) cells of at least one distributed unit (DU) in a base station to which the CU belongs through first configuration information sent by the at least one DU; and
   determining, by the CU, information about an activated CAG cell according to the configuration information of the CAG cells, and notifying the at least one DU of the information about the activated CAG cell;
   wherein the first configuration information comprises at least one of:
   indication information about a cell type, wherein the cell type comprises at least one of: a close CAG cell, a hybrid CAG cell, or a non-CAG cell;
   at least one public land mobile network (PLMN) identity to which the cell belongs;
   a CAG identity configured for a cell; or
   cell broadcast information configured at a DU side, wherein the cell broadcast information comprises at least one of: a CAG identity of a cell or indication information about a cell type;
   wherein the at least one PLMN identity to which the cell belongs and the CAG identity of the cell comprised in the first configuration information are carried by the first message, the first message is sent from the DU to the CU, and the at least one PLMN identity to which the cell belongs refers to relevant information corresponding to the cell.

2. The method of claim 1, wherein the acquiring, by the CU, the configuration information of the CAG cells of the at least one DU in the base station to which the CU belongs comprises:
   acquiring, by the CU, the configuration information of the CAG cells through a fronthaul interface between the CU and the at least one DU.

3. The method of claim 1, wherein the acquiring, by the CU, the configuration information of the CAG cells of the at least one DU in the base station to which the CU belongs comprises:
   receiving, by the CU, a first message sent by the at least one DU, wherein the first message carries the first configuration information comprising the configuration information of the CAG cells of the at least one DU.

4. The method of claim 3, wherein the first message comprises at least one of:
   an F1 setup request message or a DU configuration update request message.

5. The method of claim 1, wherein after the acquiring, by the CU, the configuration information of the CAG cells of the at least one DU in the base station to which the CU belongs, the method further comprises:
  determining, by the CU, CAG cell information of the at least one DU according to the configuration information of the CAG cells, and notifying a base station excluding the base station to which the CU belongs of the CAG cell information of the at least one DU.

6. The method of claim 5, wherein the notifying, by the CU, the base station excluding the base station to which the CU belongs of the CAG cell information of the at least one DU comprises:
  sending, by the CU, a third message carrying third configuration information to the base station excluding the base station to which the CU belongs, wherein the third configuration information is configured for indicating the CAG cell information of the at least one DU.

7. The method of claim 6, wherein the third message comprises at least one of:
  an interface setup message between base stations or a node configuration update message between base stations.

8. The method of claim 6, wherein the third configuration information comprises at least one of:
  at least one cell identity;
  indication information about a cell type, wherein the cell type comprises at least one of: a close CAG cell, a hybrid CAG cell, or a non-CAG cell;
  at least one PLMN identity to which the cell belongs; or
  a CAG identity configured for a cell.

9. The method of claim 1, further comprising:
  sending, by the CU, a paging message to a target DU to notify the target DU of paging of a designated user equipment (UE) in a target CAG cell.

10. The method of claim 9, wherein before the sending, by the CU, the paging message to the target DU, the method further comprises:
  determining, by the CU, a to-be-paged target CAG identity according to at least one CAG identity carried in a received paging message sent by a core network or according to the configuration information of the CAG cells.

11. The method of claim 9, wherein before the sending, by the CU, the paging message to the target DU, the method further comprises:
  determining, by the CU, at least one target CAG cell according to the configuration information of the CAG cells of the at least one DU in the base station to which the CU belongs,
  wherein the paging message carries a cell identity of the at least one target CAG cell.

12. The method of claim 1, further comprising:
  acquiring, by the CU, CAG information of a target access cell according to the configuration information of the CAG cells of the at least one DU and according to the target access cell of a UE;
  sending, by the CU through a fourth message, the CAG information of the target access cell to a core network for verification; and
  receiving, by the CU, verification information returned by the core network, and performing an access process on the UE according to the verification information.

13. The method of claim 12, wherein the CAG information of the target access cell comprises at least one of:
  information about a user identity;
  an identity of the target access cell;
  a CAG identity of the target access cell; or
  information indicating a type of the target access cell.

14. The method of claim 12, wherein the fourth message comprises an initial uplink UE message.

15. A non-transitory computer-readable storage medium, which is configured to store computer-executable instructions for executing the non-public network configuration method of claim 1.

16. A non-public network configuration method, comprising:
  sending, by a distributed unit (DU), configuration information of closed access group (CAG) cells to a centralized unit (CU) through the first configuration information; and
  determining, by the DU, information about an activated CAG cell according to a notification from the CU;
  wherein the first configuration information comprises at least one of:
  indication information about a cell type, wherein the cell type comprises at least one of: a close CAG cell, a hybrid CAG cell, or a non-CAG cell;
  at least one public land mobile network (PLMN) identity to which the cell belongs;
  a CAG identity configured for a cell; or
  cell broadcast information configured at a DU side, wherein the cell broadcast information comprises at least one of: a CAG identity of a cell or indication information about a cell type;
  wherein the at least one PLMN identity to which the cell belongs and the CAG identity of the cell comprised in the first configuration information are carried by the first message, the first message is sent from the DU to the CU, and the at least one PLMN identify to which the cell belongs refers to relevant information corresponding to the cell.

17. The method of claim 16, wherein after the determining, by the DU, the information about the activated CAG cell according to the notification from the CU, the method further comprises:
  sending, by the DU, cell broadcast information in the activated CAG cell.

18. The method of claim 17, wherein the cell broadcast information comprises at least one of:
  corresponding cell broadcast information configured at a DU side; or corresponding cell broadcast information configured at a CU side, wherein the corresponding cell broadcast information configured at the CU side comprises a cell identity of a neighboring cell and an indication of whether the neighboring cell supports a CAG.

* * * * *